UNITED STATES PATENT OFFICE.

ANDREW J. GUINN, OF JACKSON, TENNESSEE.

IMPROVEMENT IN HOG-CHOLERA COMPOUNDS.

Specification forming part of Letters Patent No. 202,811, dated April 23, 1878; application filed March 6, 1878.

*To all whom it may concern:*

Be it known that I, ANDREW J. GUINN, of Jackson, in the county of Madison and State of Tennessee, have invented certain new and useful Improvements in Medical Compounds; and I do hereby declare that the following is a full, clear, and exact description thereof, which will enable others skilled in the art to which it appertains to make and use the same.

This invention relates to a compound for the prevention of hog-cholera, and a cure for the same; and it consists in combining ingredients in about the proportion hereinafter named.

In making this compound I use the following ingredients, in about their stated proportion: Twenty-five ounces of sulphur, ten ounces of black antimony, two and a half ounces of charcoal, and two and a half ounces of arsenic, the above to be well mixed with about a gallon of water. The same is then generally put up in bottles, holding any desired quantity, leaving space, however, to allow the compound to be well shaken.

This compound I find, from practical experience, fully effects the ends for which it is designed.

Having thus fully described my invention, what I claim as new, and desire to secure by Letters Patent, is—

The within-described compound, consisting of sulphur, black antimony, charcoal, arsenic, and water, in about the proportions named, for the purpose set forth.

In testimony that I claim the foregoing as my own I have hereto affixed my signature in presence of two witnesses.

ANDREW J. GUINN.

Witnesses:
PETER McCALLUM,
P. McDONOUGH.